United States Patent
Balasubramanian et al.

(10) Patent No.: US 11,620,070 B2
(45) Date of Patent: Apr. 4, 2023

(54) COGNITIVE CONTROL PLANE FOR APPLICATION CONSISTENT DATASETS

(71) Applicant: Kyndryl, Inc., New York, NY (US)

(72) Inventors: Shankar Balasubramanian, Bengaluru (IN); Anil Kumar Narigapalli, Hyderabad (IN); Clea Zolotow, Key West, FL (US); Laxmikantha Sai Nanduru, Secunderabad (IN)

(73) Assignee: Kyndryl, Inc., New York, NY (US)

( * ) Notice: Subject to any disclaimer, the term of this patent is extended or adjusted under 35 U.S.C. 154(b) by 125 days.

(21) Appl. No.: 17/169,856

(22) Filed: Feb. 8, 2021

(65) Prior Publication Data
US 2022/0253218 A1    Aug. 11, 2022

(51) Int. Cl.
   *G06F 3/06* (2006.01)
   *G06N 20/00* (2019.01)
   (Continued)

(52) U.S. Cl.
   CPC .............. *G06F 3/065* (2013.01); *G06F 3/067* (2013.01); *G06F 3/0619* (2013.01);
   (Continued)

(58) Field of Classification Search
   None
   See application file for complete search history.

(56) References Cited

U.S. PATENT DOCUMENTS 6,640,278 B1 * 10/2003 Nolan .................. G06F 3/0605
                                                         707/999.102
7,376,865 B2     5/2008 Kano
                                (Continued)

FOREIGN PATENT DOCUMENTS

WO    WO2007002397 A3    1/2007

OTHER PUBLICATIONS

Cognitive engine Google definition, pp. 2, Nov. 23, 2022.*
(Continued)

*Primary Examiner* — Kaushikkumar M Patel
(74) *Attorney, Agent, or Firm* — VanLeeuwen & VanLeeuwen; Daniel C. Housley

(57) ABSTRACT

Application consistent dataset recovery using a cognitive control plane is provided. Sequence and timestamp of snapshots of volumes in a consistency group across heterogenous storage components corresponding to an application are recorded to facilitate operational recovery of application consistent datasets for the application. The cognitive control plane establishes a framework to manage, monitor, analyze, and update the consistency group and metadata to facilitate application consistent data recovery. A set of snapshots needed for the operational recovery of the application consistent datasets for the application is identified by mapping the sequence and timestamp of the snapshots of the volumes in the consistency group across the heterogenous storage components corresponding to the application in response to the computer determining that the operational recovery of the application consistent datasets for the application has been requested. The operational recovery of the application consistent datasets for the application is performed using the set of snapshots.

19 Claims, 10 Drawing Sheets

(51) Int. Cl.
  *G06F 13/16* (2006.01)
  *G06F 16/23* (2019.01)
  *G06F 21/56* (2013.01)

(52) U.S. Cl.
  CPC ...... *G06F 13/1668* (2013.01); *G06F 16/2379* (2019.01); *G06F 21/56* (2013.01); *G06N 20/00* (2019.01); *G06F 2221/033* (2013.01)

(56) References Cited

U.S. PATENT DOCUMENTS

| | | | |
|---|---|---|---|
| 7,765,187 | B2 | 7/2010 | Bergant et al. |
| 8,108,337 | B2 | 1/2012 | Boyd et al. |
| 8,548,949 | B2 | 10/2013 | Jennas, II et al. |
| 8,788,773 | B2 | 7/2014 | Goodman et al. |
| 8,850,145 | B1 | 9/2014 | Haase et al. |
| 10,176,064 | B2 | 1/2019 | Patnaik et al. |
| 11,018,991 | B1 * | 5/2021 | Vishwakarma ....... G06F 9/5055 |
| 2009/0300304 | A1 * | 12/2009 | Boyd ...................... G06F 16/27 711/E12.103 |
| 2014/0297588 | A1 | 10/2014 | Babashetty et al. |
| 2019/0012239 | A1 | 1/2019 | Wilkinson |
| 2019/0155696 | A1 | 5/2019 | Gill et al. |
| 2019/0171966 | A1 * | 6/2019 | Rangasamy ........... G06N 7/005 |
| 2019/0347029 | A1 * | 11/2019 | Ramachandran ....... G06F 3/067 |

OTHER PUBLICATIONS

Orchestration engine Google definition, pp. 2, Nov. 23, 2022.*
Zeng, "Kubernetes-based Control Plane to Manage Risk and Compliance for Hybrid Cloud," Aug. 13, 2020, accessed Nov. 1, 2020, 7 pages. https://www.ibm.com/blogs/research/2020/08/kubernetes-based-control-plane-to-manage-risk-and-compliance-for-the-cloud/.
Anonymous, "Maintaining Consistency Groups With Space Efficient Volumes," An IP.com Prior Art Database Technical Disclosure, IPCOM000211741D, Oct. 14, 2011, 5 pages.
Mell et al., "The NIST Definition of Cloud Computing", Computer Security Division, National Institute of Standards and Technology, Jan. 2011, 7 pages.

* cited by examiner

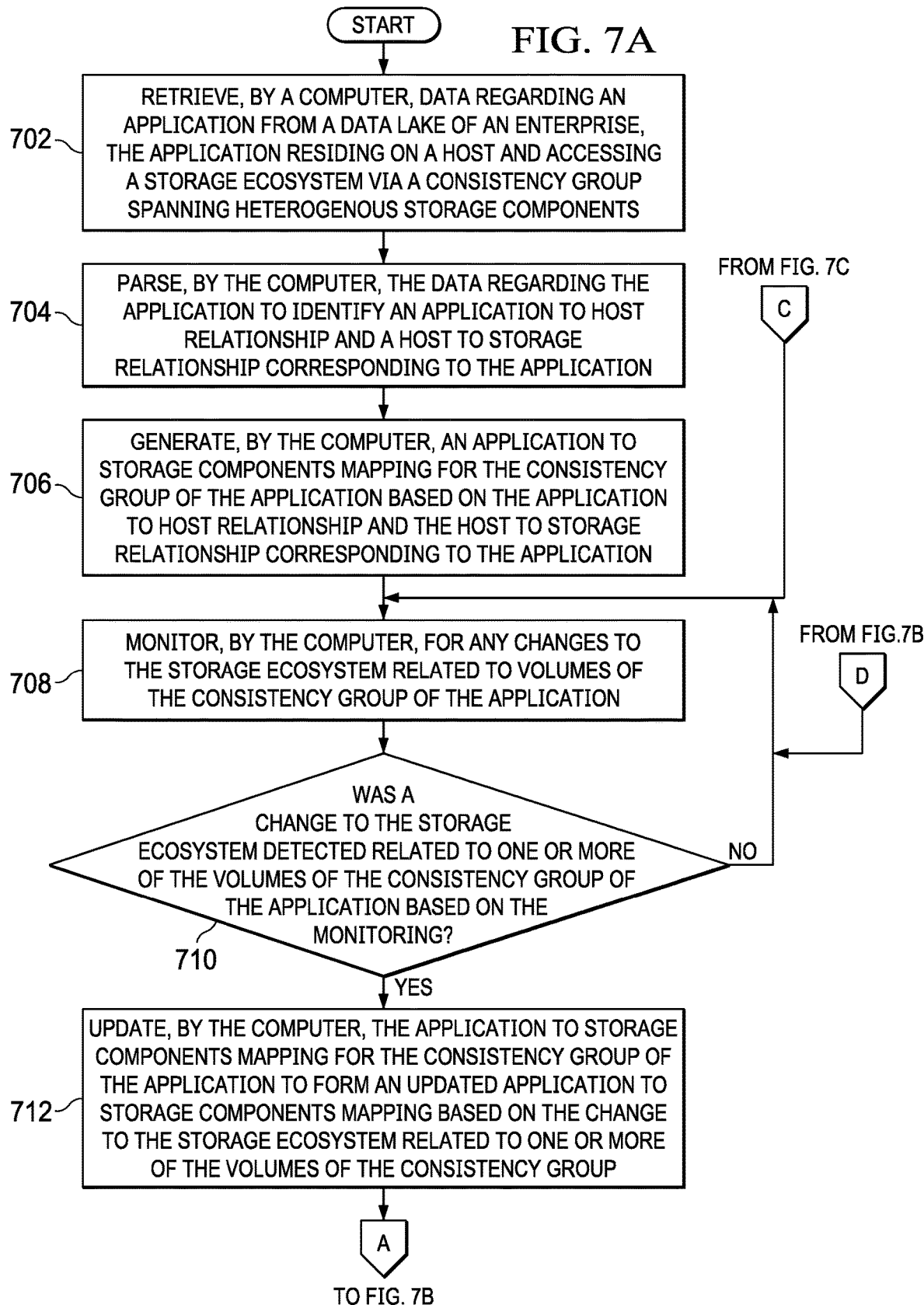

COGNITIVE CONTROL PLANE FOR APPLICATION CONSISTENT DATASETS

BACKGROUND

1. Field

The disclosure relates generally to data storage and security and more specifically to using a cognitive control plane to provide application consistent datasets during recovery to maintain data integrity.

2. Description of the Related Art

Adoption of hybrid clouds and trends in deployment and management of storage technologies in these environments has impacted the risk profile of enterprise applications adversely. Today, enterprises contend with threats to their data that span across multiple layers (e.g., geo, location-based threats to storage technologies and enterprise maturity-related factors). Improperly implemented storage consistency groups and snapshot management, lack of end-to-end data protection strategies, and gaps in capability of detecting internal and external threats to data can lead to delays in identifying and responding to these threats which can cause irreparable damage to enterprise data, which affects enterprise continuity.

A consistency group is a group of volumes that maintain write-order fidelity. The consistency group allows for snapshots of all its volumes to be taken at the same point-in-time, ensuring a consistent image of all the volumes at that point-in-time. A consistency group is typically used when a single application spans multiple volumes, and a need exists to create a snapshot of those volumes. From an application perspective, snapshots of the entire application are needed for maintaining data integrity. The group of snapshots corresponding to the multiple volumes depicts the consistency group at that specific point-in-time. Restoring the consistency group from one of its group of snapshots returns the volumes to that point-in-time. Consequently, volumes of the same consistency group typically have the same recovery point objective.

A recovery point objective (RPO) is a measurement of time from a failure, disaster, or comparable data loss-causing event. RPOs measure back in time to when data was preserved in a usable format, usually to the most recent snapshot or backup. RPOs can also refer to how much data can be lost before an enterprise encounters significant harm. RPOs determine how frequently data backup is needed. For example, high priority or mission critical applications with stringent RPO will require more frequent data protection operations (e.g., snapshots, backups, and the like).

SUMMARY

According to one illustrative embodiment, a computer-implemented method for application consistent dataset recovery using a cognitive control plane is provided. A computer, using a cognitive engine, records sequence and timestamp of snapshots of volumes in a consistency group across heterogenous storage components corresponding to an application to facilitate operational recovery of application consistent datasets for the application. The computer, using the cognitive engine, identifies a set of snapshots needed for the operational recovery of the application consistent datasets for the application by mapping the sequence and timestamp of the snapshots of the volumes in the consistency group across the heterogenous storage components corresponding to the application in response to the computer determining that the operational recovery of the application consistent datasets for the application has been requested. The computer, using the cognitive engine, performs the operational recovery of the application consistent datasets for the application using the set of snapshots. According to other illustrative embodiments, a computer system and computer program product for application consistent dataset recovery using a cognitive control plane are provided.

BRIEF DESCRIPTION OF THE DRAWINGS

FIGS. 7A-7C are a flowchart illustrating a process for application consistent dataset recovery using a cognitive control plane in accordance with an illustrative embodiment.

DETAILED DESCRIPTION

Figure 1:
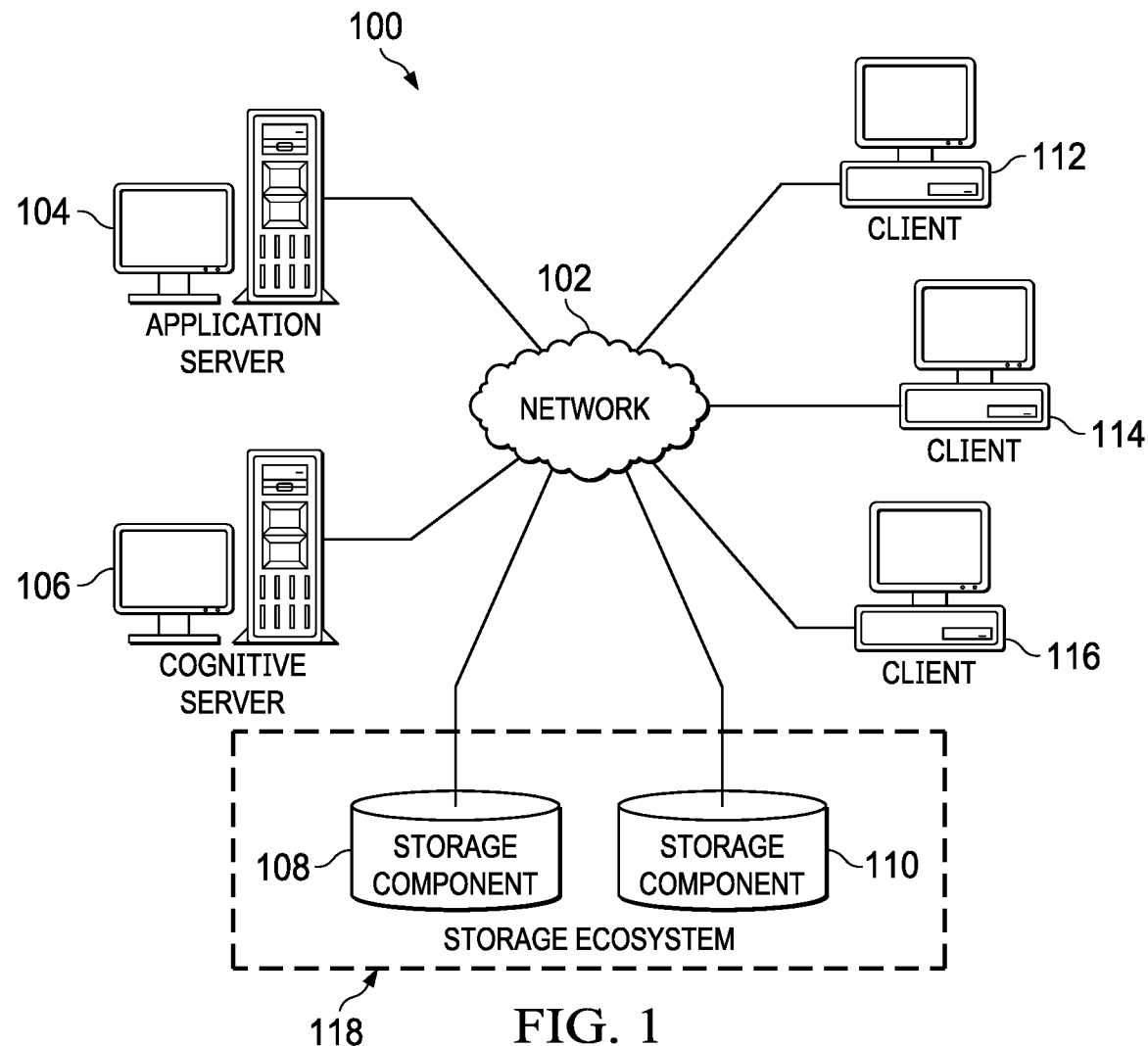
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation regarding the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, storage components, and other devices in which the illustrative embodiments may be implemented. Network data processing system 100 contains network 102, which is the medium used to provide communications links between the computers, storage components, data processing systems, and other devices connected together within network data processing system 100. Network 102 may include connections, such as, for example, wire communication links, wireless communication links, fiber optic cables, and the like.

In the depicted example, application server 104 and cognitive server 106 connect to network 102, along with storage component 108 and storage component 110. Application server 104 and cognitive server 106 may be, for example, server computers with high-speed connections to network 102. In addition, application server 104 and cognitive server 106 may each represent multiple computing nodes in one or more cloud environments managed by one or more entities. Alternatively, application server 104 and cognitive server 106 may each represent a cluster of servers in one or more data centers. Application server 104 hosts a set of applications. The set of applications may be managed by an enterprise, for example. In addition, the set of applications may represent any type and combination of applications. For example, the set of applications may perform one or more services, such as banking services, financial services, informational services, data processing services, transactional services, and the like, to clients.

Client 112, client 114, and client 116 also connect to network 102. Clients 112, 114, and 116 are clients of application server 104. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart watches, smart glasses, smart televisions, smart vehicles, smart appliances, gaming devices, kiosks, and the like, with wire or wireless communication links to network 102. Users of clients 112, 114, and 116 may utilize clients 112, 114, and 116 to access and utilize the services provided by the set of applications hosted by application server 104.

Storage component 108 and storage component 110 are network storage devices or systems capable of storing any type of data in a structured format or an unstructured format. In addition, storage component 108 and storage component 110 may each represent a plurality of network storage devices or systems. Further, storage component 108 and storage component 110 are heterogenous storage components. For example, storage component 108 may be a set of disk drives and storage component 110 may be a set of solid-state drives or storage component 108 may be a logical unit number (LUN) carved out of set of disk drives and storage component 110 may be a redundant array of independent disks (RAID). Moreover, storage component 108 and storage component 110 may reside in different environments. For example, storage component 108 may reside in an on-premises environment of the enterprise, while storage component 110 may reside in a cloud environment of a cloud provider. In addition, storage component 108 and storage component 110 may each be provided by a different storage vendor. Furthermore, storage component 108 and storage component 110 comprise storage ecosystem 118. Each respective application in the set of applications hosted by application server 104 accesses and stores data corresponding to the application in storage ecosystem 118 across heterogenous storage components 108 and 110 using a consistency group comprised of a plurality of data volumes.

Cognitive server 106 comprises a cognitive engine (i.e., cognitive control plane) that provides consistent datasets (i.e., volumes of the consistency group) corresponding to an application hosted by application server 104 during a data recovery operation to maintain data integrity of the application in an application-centric manner. Cognitive server 106 utilizes the cognitive engine to generate a single display screen view across application server 104 and storage ecosystem 118, which in this example is a heterogenous storage ecosystem that includes both on-premises and hybrid cloud storage components. The cognitive engine continuously monitors for changes occurring in storage ecosystem 118 and the set of applications hosted by application server 104. For example, as new volumes are added to the storage components or existing volumes are dropped in relation to a particular application, or any parametric changes to the existing volumes occur, the cognitive engine recognizes these changes and updates and maintains the consistency group corresponding to that particular application, the application to storage components mapping, and the corresponding metadata by learning the changes made in the entire storage ecosystem 118.

The cognitive engine, which is managed independently of storage ecosystem 118, consists of a rules engine and an analytics engine. The rules engine enables a user (e.g., system administrator) to apply custom rules on the metadata via the analytics engine to derive actionable insights, which help to maintain data integrity, enterprise continuity, and strong data security posture across the on-premises and hybrid cloud storage components of storage ecosystem 118. The cognitive engine, based on the custom rules, monitors behavior of storage ecosystem 118, especially abnormal behavior (e.g., sudden deletion of storage volumes, large increase or decrease in size of volumes, data integrity issues, delay in snapshots creation and execution in accordance with schedules, changes in LUN topology (i.e., raid, tier, and mirroring), unauthorized access, unauthorized activities, and the like), and sends alerts regarding such abnormal behavior, which can adversely impact the application dataset integrity, recoverability, RPO, and performance. This rule-based monitoring enables the cognitive engine to contain any incident and stage an application consistent dataset recovery before any changes propagate to a secondary replication site (e.g., disaster recovery site). Further, the analytics engine performs rule-based analytics to control and manage the integrated storage ecosystem 118 effectively. It should be noted that the cognitive engine can be customized to be highly sensitive to detecting variances for mission critical data. Furthermore, the cognitive engine can be provided as a cloud service.

In addition, it should be noted that network data processing system 100 may include any number of additional servers, storage components, clients, and other devices not shown. Program code located in network data processing system 100 may be stored on a computer readable storage medium or a set of computer readable storage media and downloaded to a computer or other data processing device for use. For example, program code may be stored on a computer readable storage medium on application server 104 and downloaded to client 112 over network 102 for use on client 112.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one" of means any combination of items and number of items may be used from the list, but not all the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
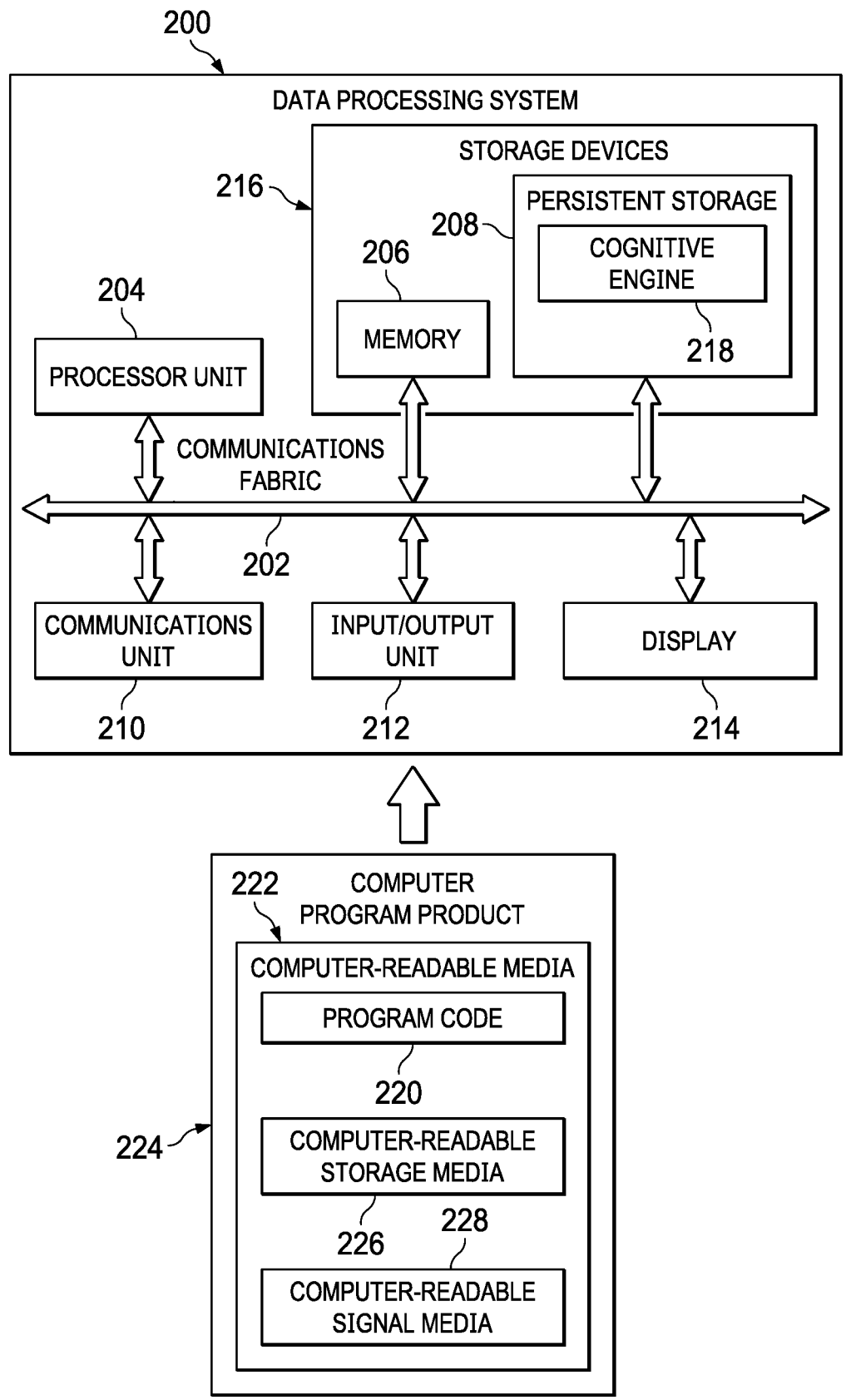
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as cognitive server 106 in FIG. 1, in which computer readable program code or instructions implementing the application consistent dataset recovery processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Furthermore, a computer readable storage device or a computer readable storage medium may represent a set of computer readable storage devices or a set of computer readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores cognitive engine 218. However, it should be noted that even though cognitive engine 218 is illustrated as residing in persistent storage 208, in an alternative illustrative embodiment, cognitive engine 218 may be a separate component of data processing system 200. For example, cognitive engine 218 may be a hardware component coupled to communication fabric 202 or a combination of hardware and software components.

Cognitive engine 218 controls the process of providing consistent data volumes in a consistency group of an application hosted by an application server, such as, for example, application server 104 in FIG. 1, across heterogenous storage components in a storage ecosystem during a data recovery operation to maintain data integrity of the application in an application-centric manner using, for example, machine learning. A machine learning model can learn without being explicitly programmed to do so. The machine learning model can learn based on training data input into the machine learning model. The machine learning model can learn using various types of machine learning algorithms. The machine learning algorithms include at least one of supervised learning, unsupervised learning, feature learning, sparse dictionary learning, anomaly detection, association rules, or other types of learning algorithms. Examples of machine learning models include an artificial neural network, a decision tree, a support vector machine, a Bayesian network, a genetic algorithm, and other types of models. These machine learning models can be trained using historical application to storage components mappings and corresponding metadata, for example.

As a result, data processing system 200 operates as a special purpose computer system in which cognitive engine 218 in data processing system 200 enables application consistent dataset recovery. In particular, cognitive engine 218 transforms data processing system 200 into a special purpose computer system as compared to currently available general computer systems that do not have cognitive engine 218.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server, network, and storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
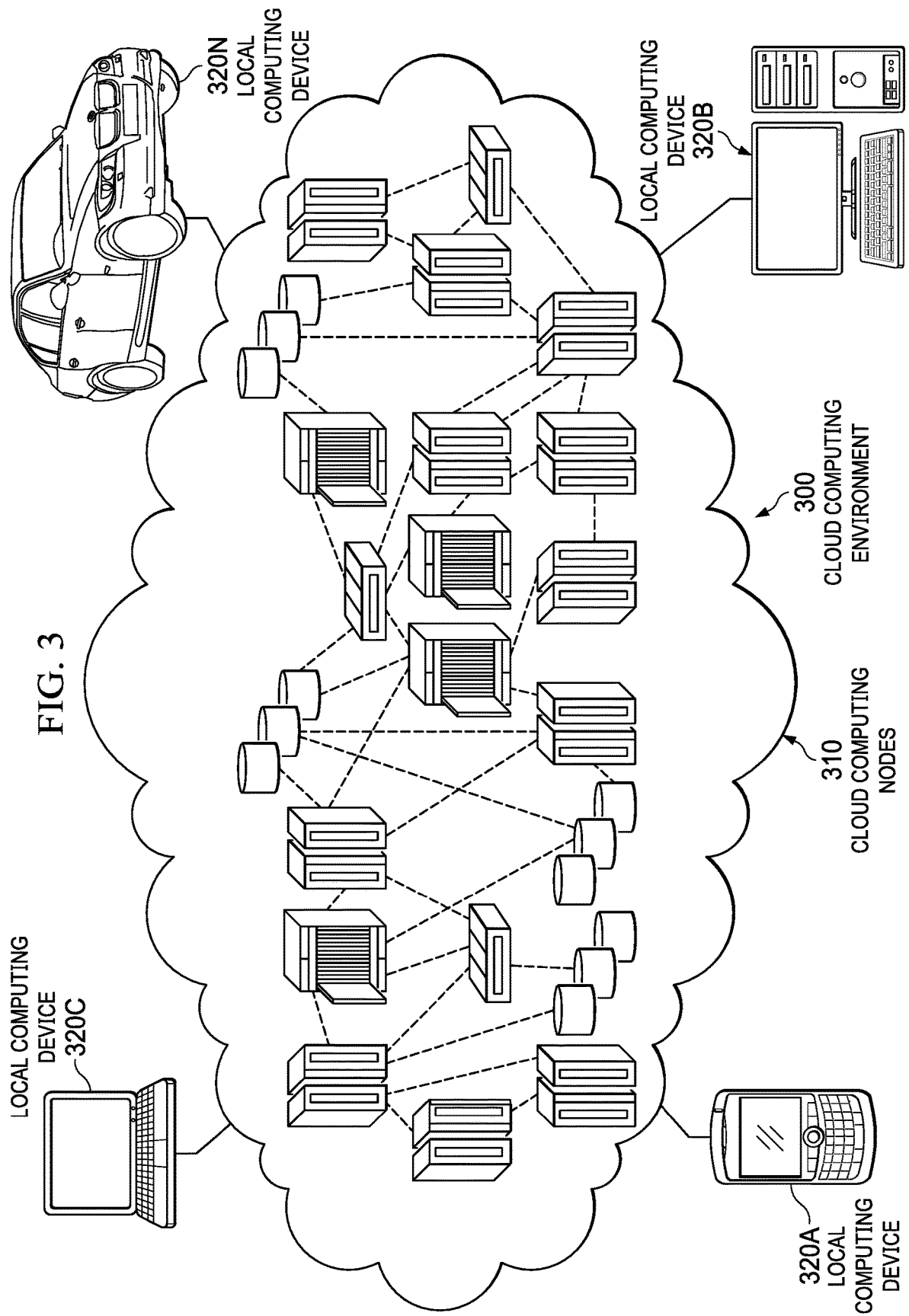
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, application server 104 and cognitive server 106 in FIG. 1. Local computing devices 320A-320N may be, for example, clients 112-116 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
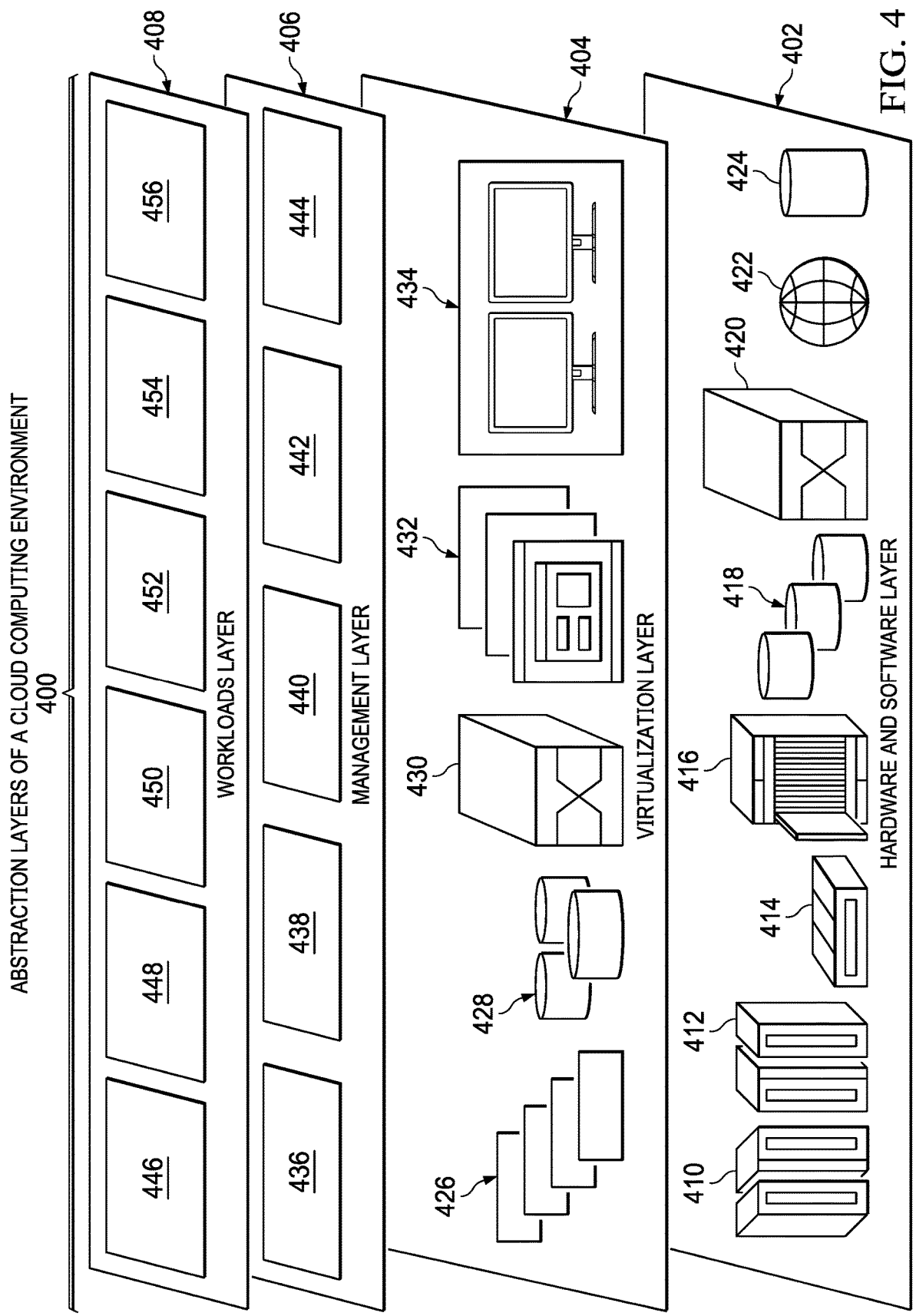
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and application consistent dataset recovery management 456.

To overcome threats to data, an overall view of an entire storage ecosystem is a necessity as opposed to the traditional compartmentalized view. From a storage perspective, this drives a shift in strategy from an isolated, platform-centric methodology to an integrated, application-centric methodology to combat possible threats to data in an effective way. The benefits of an integrated, application-centric methodology approach are decreasing recovery time during incidents, making data recovery consistent across source (e.g., primary production) and target (secondary replication) sites, meeting RPO requirements, and the like. To accomplish these benefits, an enterprise needs to have a viable data protection strategy to safeguard its data against multidimensional threats. In other words, an enterprise needs a capability to manage consistency groups and snapshot lifecycles, assess data integrity, detect unauthorized access, and contain impact of unauthorized access on data integrity. This helps ensure application consistent data recovery points, which enable lifecycle management of a heterogenous storage ecosystem and maintain a strong end-to-end data recovery posture.

Today, no solution currently exists that can: a) perform integrated lifecycle management of a consistency group and its corresponding snapshots in relation to an enterprise application; b) enable early unauthorized access detection; and c) stage an application consistent dataset recovery. Illustrative embodiments provide a cognitive engine (i.e., cognitive control plane) that enables such functionality via a single display screen view across an entire storage ecosystem, which may span traditional data center storage components and hybrid cloud-based storage components.

In other words, illustrative embodiments provide integrated end-to-end control of an entire storage ecosystem by maintaining consistency groups and snapshot lifecycles cognitively, detecting application and storage component changes using application to storage component mappings, continuously assessing data integrity, proactively detecting external and internal unauthorized access and corresponding impacts to data integrity in regular intervals, utilizing metadata corresponding to snapshots to ensure consistent recovery points for datasets (i.e., data volumes of a consistency group), enabling fully automated lifecycle management of the integrated storage ecosystem, and establishing a strong end-to-end recovery posture. Moreover, illustrative embodiments can monitor for and automatically correct storage ecosystem configurational errors, initiate measures to contain damage, and perform data recovery without impacting RPO commitments.

Illustrative embodiments generate the single display screen view of all applications running in the enterprise showing their application to storage components mappings, consistency groups and all metadata corresponding to the consistency groups, snapshots, and storage components. This single display screen view also shows both the source primary production site and the target secondary replication site. It should be noted that a storage ecosystem that spans several platforms, as well as spanning on-prem and cloud deployments, is not only laborious to maintain manually, but is extremely complex when taking into account the variety of applications that run in an enterprise. Further, hybrid-cloud deployments make the task of monitoring and tracking storage component and consistency group level changes challenging and difficult. However, the cognitive engine of illustrative embodiments takes into account and addresses all these challenges.

For example, the cognitive engine of illustrative embodiments centralizes management of storage ecosystem, snapshot, RPO, performance, and recovery needs and enables tracking of inter-dependencies among these different needs in a consistent and easy manner via the single display screen view. It should be noted that several of these inter-dependencies are tracked manually today and, therefore, changes can either be lost or not tracked given the complexity of the IT environment. The cognitive engine dynamically applies a set of rules for each consistency group when a change is detected, ensuring proactive management of any change to prevent conditions leading to data integrity breaches or losses. In other words, the cognitive engine applies rules to perform analytics, detect configuration and topological changes, identify threats, identify performance deviations, track RPO conformance from an application centric standpoint, and the like.

Moreover, the cognitive engine can analyze any inter-related metadata group to proactively detect and manage changes (i.e., the cognitive engine can be applied to not only consistency groups, but any grouping of metadata that characterizes an application, such as, for example, a performance group consisting of processor, memory, network, and the like). In addition, in a cloud environment using multiple different storage vendors, the cognitive engine can monitor disparate, heterogenous storage components in an application-centric manner as well. Further, illustrative embodiments utilize an enterprise data lake to store the application to storage components mapping and corresponding metadata enabling expeditious and application consistent datasets recovery occurring from data loss incidents.

First, illustrative embodiments map an application to multiple storage volumes residing in multiple storage components of a storage ecosystem. The group of multiple volumes is called the consistency group. For example, a database application can be mapped to block storage for storing database tables and transaction logs can be mapped to a higher performance storage, such as, for example, flash memory, because the transaction logs are written to storage more often. It should be noted that these different types of storage components can be homogenous storage (i.e., provided by the same storage vendor) or heterogenous storage (i.e., provided by multiple different storage vendors).

When an application's data needs to be backed up or replicated (e.g., for disaster recovery), illustrative embodiments quiesce the application and flush all the application's data to multiple storage components. Then, illustrative embodiments perform a current snapshot on each volume of the consistency group at that point-in-time in a coordinated manner. After illustrative embodiments perform the snapshots corresponding to the consistency group, the application can continue its I/O operations. Illustrative embodiments replicate these snapshots to a remote target location (i.e., a secondary replication site) for data recovery purposes. Illustrative embodiments perform these snapshot operations at regular intervals, which are dictated by RPO, for example.

Consequently, illustrative embodiments create and store multiple sets of snapshots over time. However, snapshots consume storage. As a result, illustrative embodiments periodically delete previous snapshots having an age greater than a defined snapshot age threshold value in both the source primary production site and the target secondary replication site to maintain optimal usage of storage capacity. Further, illustrative embodiments can change the number of storage components corresponding to the consistency group (e.g., add or remove storage components) or illustrative embodiments can dynamically increase or decrease capacity of one or more of the storage components corresponding to the consistency group to adjust to the current needs of the application.

Illustrative embodiments maintain metadata corresponding to each respective consistency group in the source primary production site. The metadata contain identifiers of storage components and identifiers of snapshots stored in respective storage components. Illustrative embodiments utilize the identifiers in the metadata to keep track of the storage components and their corresponding snapshots. Illustrative embodiments also map the application to the various storage components of the source primary production site. Further, illustrative embodiments maintain similar information in the target secondary replication site. Illustrative embodiments independently discover and maintain the metadata at the target secondary replication site because the storage component and snapshot identifiers will be different on the target secondary replication site. Furthermore, it should be noted that for a particular consistency group, the identifiers of the storage components and their corresponding snapshots are dynamic as illustrative embodiments can change storage components and delete snapshots corresponding to the consistency group. Consequently, illustrative embodiments continually update this information on a regular basis. Moreover, illustrative embodiments can detect these changes so the metadata of each respective consistency group is in synchronization with its corresponding application at a periodicity specified by the user per each respective consistency group.

After illustrative embodiments achieve the state above, illustrative embodiments perform the following steps. Illustrative embodiments maintain the metadata in an enterprise data lake, which is stored in the cloud, in a secure manner. Illustrative embodiments utilize this metadata to apply best practices and a set of rules per consistency group depending on the storage vendor specific checks, as well as application specific checks. The application specific checks may be, for example: the ability for each respective storage component to be part of a particular consistency group (e.g., do any inherent vendor specific conflicts exist for a storage component to be included in a particular consistency group); are illustrative embodiments maintaining the correct number of snapshots (e.g., too many or too few snapshots); and the like. Illustrative embodiments can implement rules to check these functions periodically.

Illustrative embodiments may also implement a rule to perform periodic virus scans on the snapshots to detect unauthorized access (e.g., to maintain data integrity by preventing data corruption by an unauthorized user) and determine which snapshot combinations of a consistency group are valid in the event illustrative embodiments need to perform a recovery. Illustrative embodiments perform the virus scans on the target secondary replication site only and not on the source primary production site to prevent performance degradation on the source primary production site.

Illustrative embodiments can perform the above-described functions via a cloud "cognitive engine-as-a-service" because illustrative embodiments maintain the application to storage components mapping and corresponding metadata in the enterprise data lake in the cloud. Illustrative embodiments may also include RPO values corresponding to each respective consistency group in the metadata to check whether the RPO requirements match the snapshot periodicity, for example. Illustrative embodiments can customize metadata collection and maintenance and implement rules per the needs of each particular application. In addition, illustrative embodiments can generate all the applications to storage components mappings in an enterprise at any point in time, which illustrative embodiments can use to detect storage utilization changes per application or in the entire enterprise. Illustrative embodiments utilize theses mapping to generate the single display screen view of application to storage mappings for the entire enterprise (e.g., on-premises and in cloud where the cloud may be the target or secondary replication site and on-premises may be the source or primary production site). Because a hybrid deployment (e.g., on premise and in the cloud) is becoming the de-facto standard, this is an important and complex factor for a customer to enable and monitor.

It should be noted that illustrative embodiments can also detect whether a particular storage component logical unit number (LUN) is mapped to a particular application by doing reverse mapping of that LUN to the application. Illustrative embodiments may utilize this reverse mapping to detect unused storage component LUNs in a storage ecosystem, which illustrative embodiments can reclaim, or to detect whether storage component LUNs were created with the correct topology per requirements of the application (e.g., RAID-DP, mirror, and the like). Illustrative embodiments can also implement rules to check whether storage components are reaching defined storage utilization thresholds so illustrative embodiments can allocate additional storage capacity if needed before the application runs out of storage.

Further, illustrative embodiments can also track and analyze performance of the storage components in relation to a particular application over the lifetime of the application and generate actionable insights that will assist in tuning storage component performance. This may include potential data migration scenarios to higher performance storage components.

Illustrative embodiments apply the set of rules corresponding to the consistency group and derive actions, which illustrative embodiments can either feed these derived actions into an automation system for automatic execution or generate a plan based on the derived actions for implementation by a system administrator. For example, when a new LUN provisioned to an application is different in terms of topology (e.g., RAID, tier, block size, compression, de-duplication, or the like) from existing LUNS currently serving the application, illustrative embodiments generate a plan for remediation.

The above-described conditions are not exhaustive and illustrative embodiments can implement any number of rules involving new requirements to manage application dataset integrity, recoverability, and performance. Illustrative embodiments can change and apply these rules proactively for cognitive analysis and reporting.

As a result, illustrative embodiments increase service delivery quality, decrease penalties incurred due to service level agreement breaches, optimize the storage ecosystem, and increase enterprise continuity for customers.

Thus, illustrative embodiments provide one or more technical solutions that overcome a technical problem with providing application consistent datasets spanning heterogenous storage components during recovery to maintain data integrity. As a result, these one or more technical solutions provide a technical effect and practical application in the field of data storage and security.

Figure 5A:
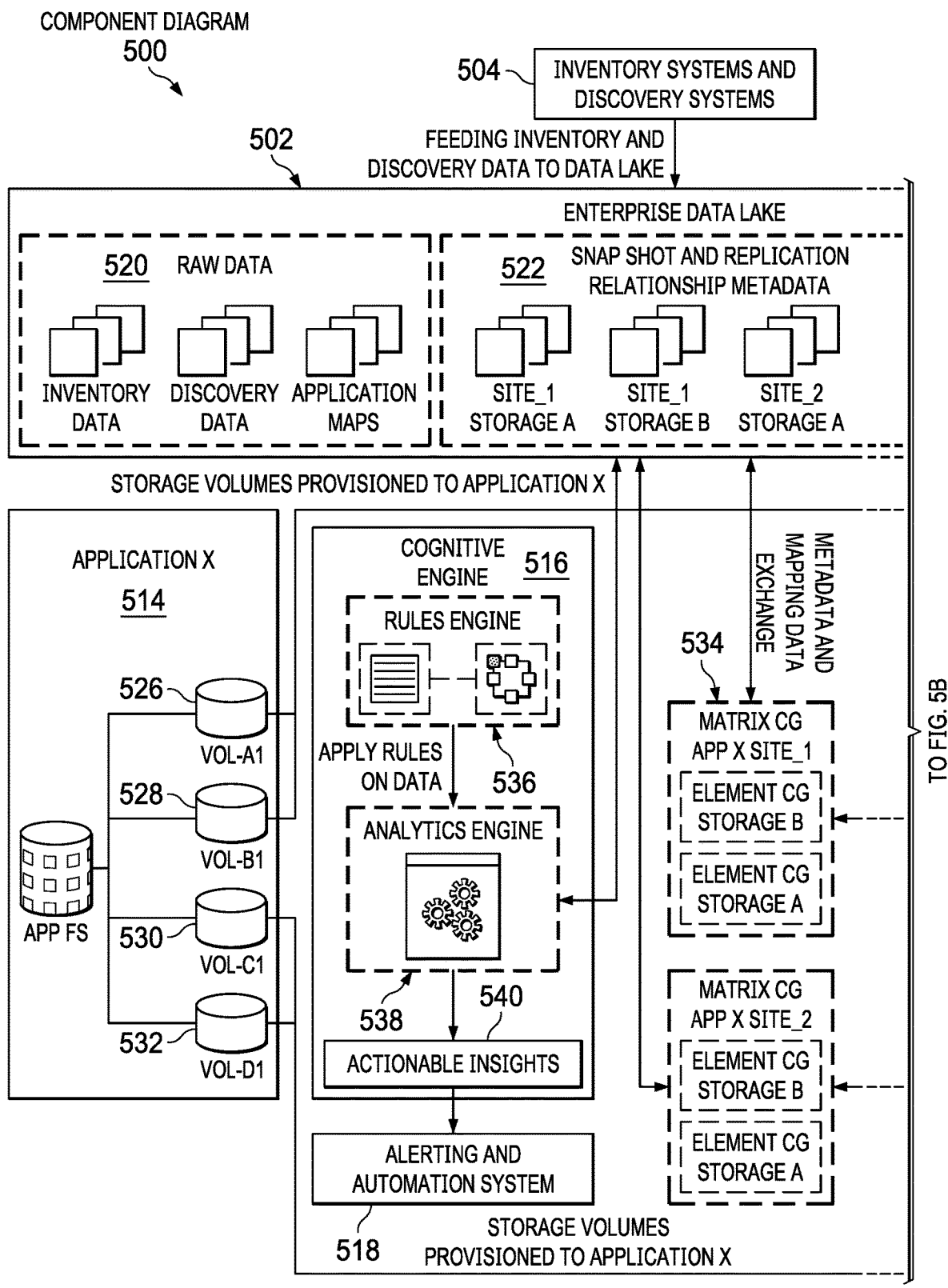
FIGS. 5A-5B are an example of a component diagram in accordance with an illustrative embodiment.
Figure 5B:
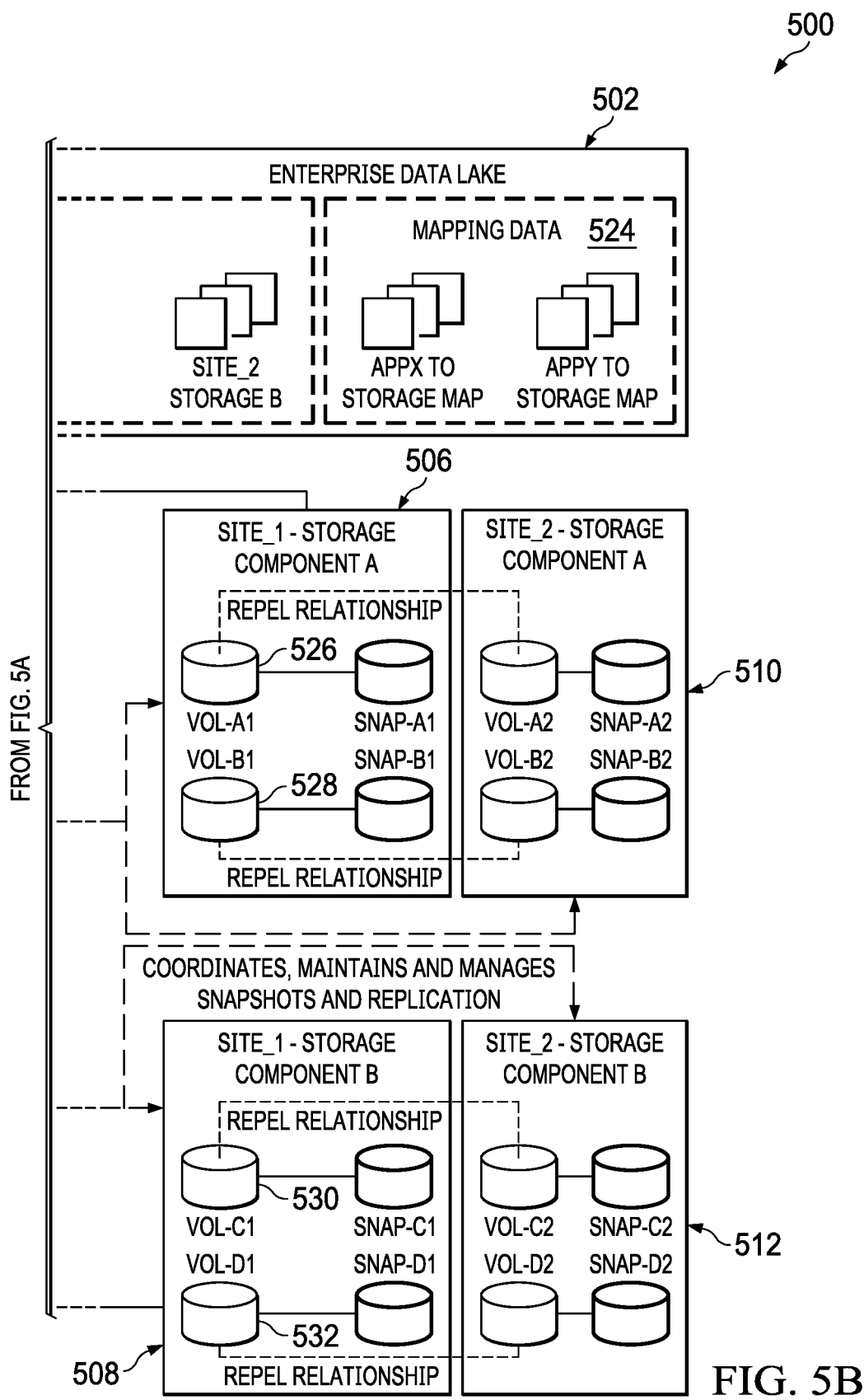

With reference now to FIGS. 5A-5B, an example of a component diagram is depicted in accordance with an illustrative embodiment. Components of component diagram 500 may be implemented in a network of data processing systems, such as network data processing system 100 in FIG. 1, or a cloud computing environment, such as cloud computing environment 300 in FIG. 3. Component diagram 500 represents a system of hardware and software components for providing application consistent datasets recovery.

In this example, component diagram 500 includes enterprise data lake 502, inventory systems and discovery systems 504, storage component A 506 of primary site 1, storage component B 508 of primary site 1, storage component A 510 of target secondary site 2, storage component B 512 of target secondary site 2, application X 514, cognitive engine 516, and alerting and automation system 518. However, it should be noted that component diagram 500 is intended as an example illustration only and not as a limitation on illustrative embodiments. In other words, component diagram 500 may include more or fewer components than shown. For example, a component may be split into two or more components, two or more components may be combined into one component, a component may be removed, a component not shown may be added, and the like.

Enterprise data lake 502 stores a plurality of different types of data corresponding to a particular enterprise. Enterprise data lake 502 may be stored in a cloud environment, for example. Enterprise data lake 502 receives a feed of inventory and discovery data from inventory systems and discovery systems 504. Raw data 520 represents information in the inventory and discovery data feed. The inventory and discovery data feed may include, for example, information related to applications, such as application X 514, of the enterprise, servers hosting the applications, storage components storing data corresponding to the applications, application to host relationships, host to storage component relationships, and the like.

Enterprise data lake 502 also stores snapshot and replication relationship metadata 522 and mapping data 524. Snapshot and replication relationship metadata 522 contain identifiers of snapshots and their corresponding storage components, along with replication relationships between volumes residing on the primary and target secondary sites. Mapping data 524 contain a mapping between each respective application, such as application X 514, and a set of storage components, such as storage component A 506 and storage component B 508, storing different volumes, such as volume-A1 526, volume-B 1 528, volume-C1 530, and volume-D1 532, of a consistency group, such as matrix consistency group 534 corresponding to application X 514 and primary site 1. In this example, volume-A1 526 and volume-B 1 528 reside on storage component A 506 and volume-C1 530 and volume-D1 532 reside on storage component B 508. Storage component A 506 and storage component B 508 may be, for example, storage component 108 and storage component 110 in FIG. 1.

Cognitive engine 516 may be, for example, cognitive engine 218 in FIG. 2. Cognitive engine 516 coordinates, maintains, and manages snapshots and replication relationships of the different volumes residing on storage component A 506 and storage component B 508 of primary site 1 and storage component A 510 and storage component B 512 of target secondary site 2 using rules engine 536 applying custom rules on snapshot and replication relationship metadata 522 and mapping data 524 corresponding to application X 514. In addition, cognitive engine 516 utilizes analytics engine 538 to generate actionable insights 540 based on application of the custom rules by rules engine 536. Actionable insights 540 may include at least one of recommendations, alerts, and action steps. A recommendation may include, for example, RPO recommendation. An alert may include, for example, an indication that a snapshot of one or more volumes did not complete. An action step may include, for example, automatically changing storage topology to increase performance of application X 514. Analytics engine 538 sends actionable insights 540 to alerting and automation system 518 for sending recommendations and alerts to appropriate users and automatically implementing action steps.

Storage component A 510 and storage component B 512 of target secondary site 2 provide data backup for the volumes and snapshots stored on storage component A 506 and storage component B 508 of primary site 1, which may be, for example, a production site. Cognitive engine 516 performs a virus scan on storage component A 510 and storage component B 512 to assess data integrity to detect unauthorized access to one or more of the volumes and also determine which snapshot combinations are valid in case an application dataset recovery needs to be performed.

Figure 6:
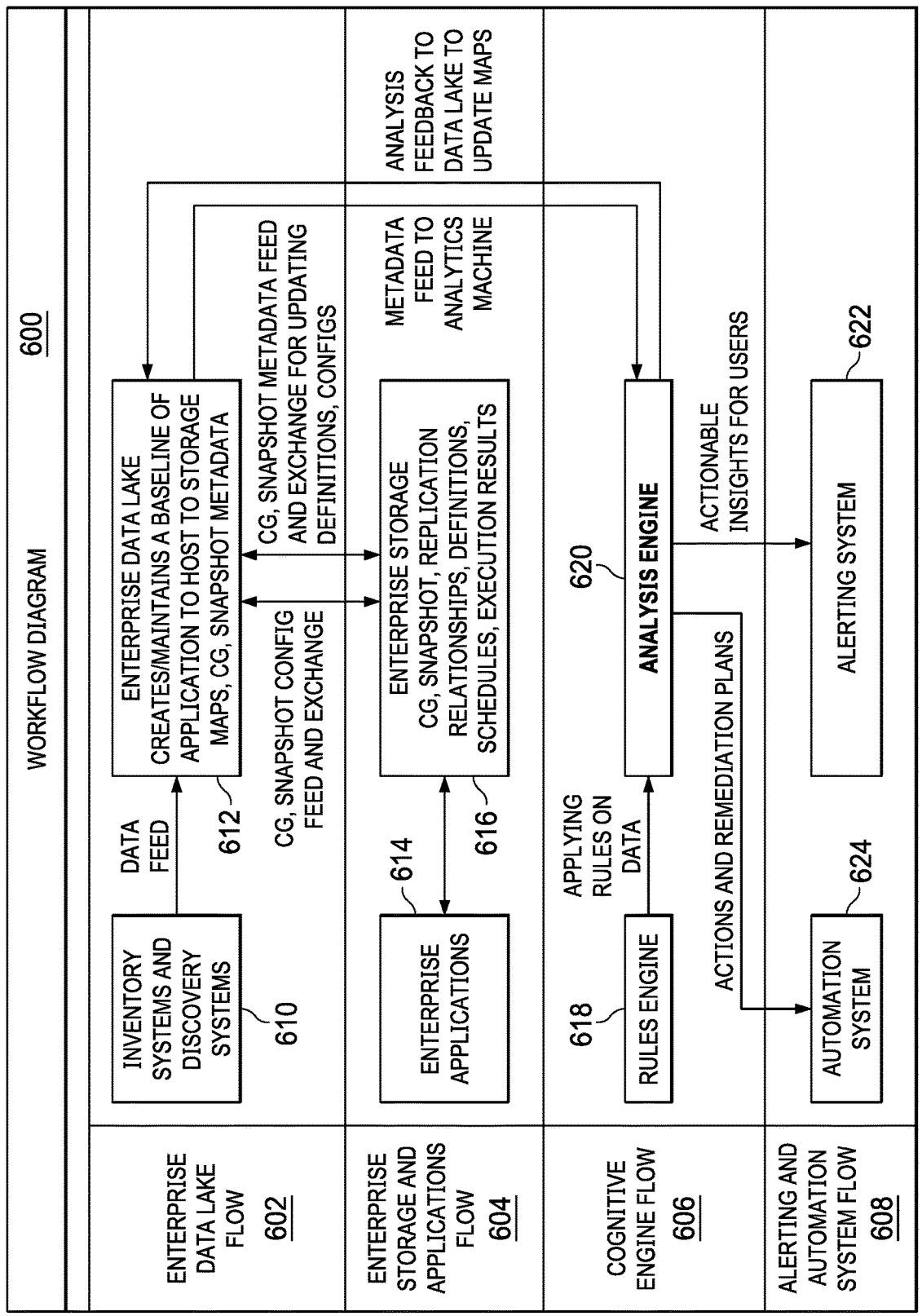
FIG. 6 is an example of a workflow diagram in accordance with an illustrative embodiment.

With reference now to FIG. 6, an example of a workflow diagram is depicted in accordance with an illustrative embodiment. The workflow of workflow diagram 600 may be implemented in components of component diagram 500 in FIGS. 5A-5B. In this example, workflow diagram 600 comprises enterprise data lake flow 602, enterprise storage and applications flow 604, cognitive engine flow 606, and alerting and automation system flow 608.

Enterprise data lake flow 602 includes inventory systems and discovery systems 610 and enterprise data lake 612, such as, for example, inventory systems and discovery systems 504 and enterprise data lake 502 in FIGS. 5A-5B. Inventory systems and discovery systems 610 provides a data feed of inventory and discovery data to enterprise data lake 612. Enterprise data lake 612 creates and maintains a baseline of application to host maps, host to storage maps, application consistency groups, sets of consistency group snapshots and their corresponding metadata, and the like.

Enterprise storage and applications flow 604 includes enterprise applications 614 and enterprise storage 616, such as, for example, application X 514 and storage components 506-512 in FIG. 5B. Enterprise applications perform I/O operations on enterprise storage 616. Enterprise storage 616 maintains consistency groups of enterprise applications 614, snapshots of the consistency groups, replication relationship information between source primary production site and target secondary replication site regarding backup volumes and snapshots, definitions, configurations, schedules, execution results, and the like. Enterprise storage 616 and enterprise data lake 612 exchange and share information providing updates on a continuous, intermittent, or on-demand basis.

Cognitive engine flow 606 includes rules engine 618 and analytics engine 620, such as, for example, rules engine 536 and analytics engine 538 of cognitive engine 516 of FIG. 5A. Rules engine 618 comprises custom rules. Rules engine 618 applies a set of the custom rules on metadata received by analytics engine 620 from enterprise data lake 612. Analytics engine 620 performs analysis of the metadata received from enterprise data lake 612 based on the set of custom rules applied by rules engine 618 on the metadata. Analytics engine 620 provides an analysis feed to enterprise data lake 612 so that enterprise data lake 612 can update the application to host and host to storage maps.

Based on the analysis of the metadata, analytics engine 620 generates actionable insights for users and action steps and remediation plans. Analytics engine 620 outputs the actionable insights to alerting system 622 and the action steps and remediation plans to automation system 624 of alerting and automation system flow 608. Alerting system 622 and automation system 624 may be, for example, components of alerting and automation system 518 of FIG. 5A.

Figure 7B:
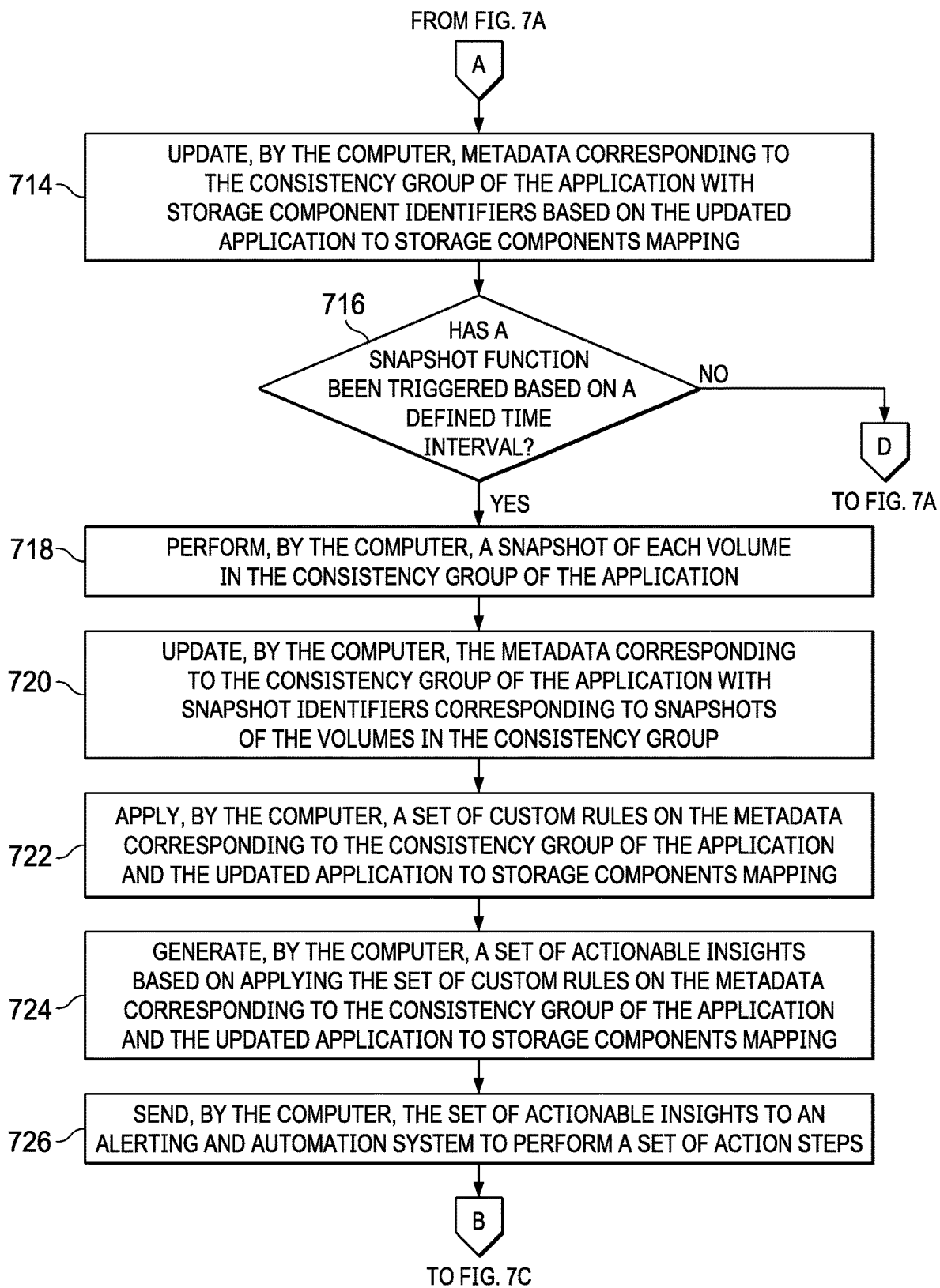
Figure 7C:
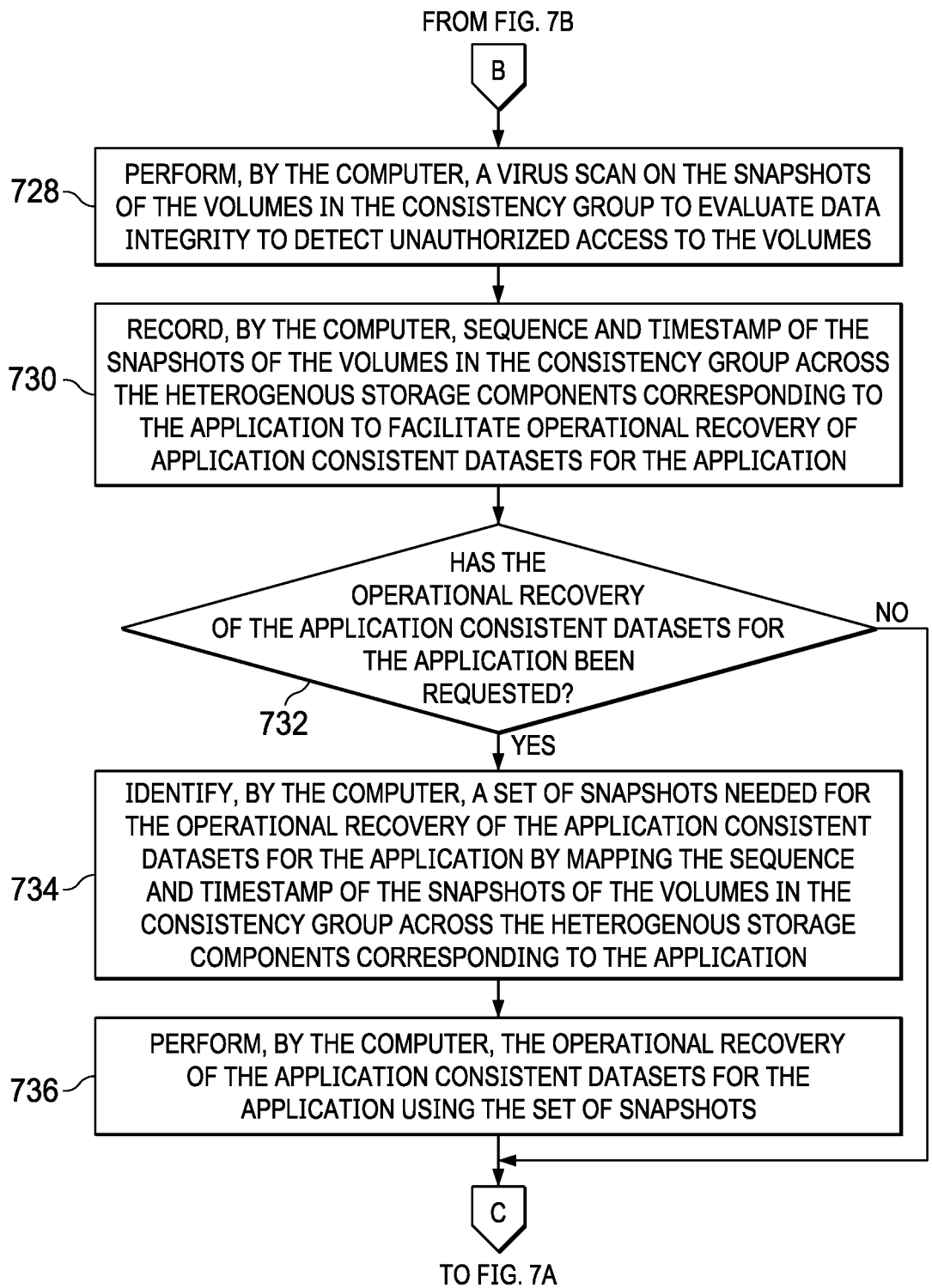

With reference now to FIGS. 7A-7C, a flowchart illustrating a process for application consistent dataset recovery using a cognitive control plane is shown in accordance with an illustrative embodiment. The process shown in FIGS. 7A-7C may be implemented in a computer, such as, for example, cognitive server 106 in FIG. 1, data processing system 200 in FIG. 2, or a cloud computing node of cloud computing nodes 310 in FIG. 3. For example, the process shown in FIGS. 7A-7C may be implemented in a cognitive engine, such as cognitive engine 218 in FIG. 2 or cognitive engine 516 in FIG. 5A.

The process begins when the computer, using the cognitive engine, retrieves data regarding an application from a data lake of an enterprise (step 702). The application resides on a host and accesses a storage ecosystem via a consistency group spanning heterogenous storage components. The application and the data lake of the enterprise may be, for example, application X 514 and enterprise data lake 502 in FIGS. 5A-5B. The host, storage ecosystem, and heterogenous storage components may be, for example, application server 104, storage ecosystem 118, and storage components 108 and 110 in FIG. 1, respectively.

The computer, using the cognitive engine, parses the data regarding the application to identify an application to host relationship and a host to storage relationship corresponding to the application (step 704). The cognitive engine may utilize, for example, natural language processing to parse the data and identify the relationships. The computer, using the cognitive engine, generates an application to storage components mapping for the consistency group of the application based on the application to host relationship and the host to storage relationship corresponding to the application (step 706).

The computer, using the cognitive engine, monitors for any changes to the storage ecosystem related to volumes of the consistency group of the application by analyzing the metadata fed to the cognitive engine from the data lake (step 708). The computer, using the cognitive engine, makes a determination as to whether a change to the storage ecosystem was detected related to one or more of the volumes of the consistency group of the application based on the monitoring (step 710). If the computer determines that a change to the storage ecosystem was not detected related to one or more of the volumes of the consistency group of the application based on the monitoring, no output of step 710, then the process returns to step 708 where the computer continues to monitor for changes. If the computer determines that a change to the storage ecosystem was detected related to one or more of the volumes of the consistency group of the application based on the monitoring, yes output of step 710, then the computer, using the cognitive engine, updates the application to storage components mapping for the consistency group of the application to form an updated application to storage components mapping based on the change to the storage ecosystem related to the one or more of the volumes of the consistency group (step 712). In addition, the computer, using the cognitive engine, updates metadata corresponding to the consistency group of the application with storage component identifiers based on the updated application to storage components mapping (step 714).

The computer, using the cognitive engine, also makes a determination as to whether a snapshot function has been triggered based on a defined time interval (step 716). The defined time interval may be any span of time based on, for example, RPO. If the computer determines that the snapshot function has not been triggered based on the defined time interval not expiring, no output of step 716, then the process returns to step 708 where the computer continues to monitor for changes. If the computer determines that the snapshot function has been triggered based on expiration of the defined time interval, yes output of step 716, then the computer, using the cognitive engine, performs a snapshot of each volume in the consistency group of the application in a coordinated manner at that point-in-time (step 718). The computer, using the cognitive engine, also updates the metadata corresponding to the consistency group of the application with snapshot identifiers corresponding to snapshots of the volumes in the consistency group (step 720).

Further, the computer, using a rules engine of the cognitive engine, applies a set of custom rules on the metadata corresponding to the consistency group of the application and the updated application to storage components mapping (step 722). It should be noted that rules can be customized per application, per consistency group, per storage component, per storage ecosystem, and the like. Furthermore, the computer, using an analytics engine of the cognitive engine, generates a set of actionable insights based on the rules engine applying the set of custom rules on the metadata corresponding to the consistency group of the application and the updated application to storage components mapping (step 724). The set of actionable insights may include, for example, a recommendation to adjust the RPO (e.g., increase or decrease the interval of time between snapshot operations). The set of actionable insights may also include alerts, such as, for example, storage component down alert, snapshot operation failed alert, additional storage capacity is needed for the application alert, no matching storage topology exists for the application affecting application performance alert, and the like. It should be noted that the actionable insights may be customizable per customer (e.g., enterprise).

The computer sends the set of actionable insights to an alerting and automation system to perform a set of action steps (step 726). The alerting and automation system may be, for example, alerting and automation system 518 in FIG. 5A. The set of actions may include, for example, automatically sending the recommendations and alerts to appropriate users, such as storage or system administrators. The set of actions may also include automatically changing storage topology from one storage component to another storage component when an anomaly or failure is detected, automatically triggering the snapshot function when a backup was not performed at the RPO, and the like.

Moreover, the computer performs a virus scan on the snapshots of the volumes in the consistency group to evaluate data integrity to detect unauthorized access to the volumes (step 728). In addition, the computer, using the cognitive engine, records sequence and timestamp of the snapshots of the volumes in the consistency group across the heterogenous storage components corresponding to the application to facilitate operational recovery of application consistent datasets for the application (step 730).

The computer makes a determination as to whether the operational recovery of the application consistent datasets for the application has been requested (step 732). If the computer determines that the operational recovery of the application consistent datasets for the application has not been requested, no output of step 732, then the process returns to step 708 where the computer continues to monitor for changes. If the computer determines that the operational recovery of the application consistent datasets for the application has been requested, yes output of step 732, then the computer, using the cognitive engine, identifies a set of snapshots needed for the operational recovery of the application consistent datasets for the application by mapping the sequence and timestamp of the snapshots of the volumes in the consistency group across the heterogenous storage components corresponding to the application (step 734). Afterward, the computer, using the cognitive engine, performs the operational recovery of the application consistent datasets for the application using the set of snapshots (step 736). Thereafter, the process returns to step 708 where the computer continues to monitor for changes.

Thus, illustrative embodiments of the present invention provide a computer-implemented method, computer system, and computer program product for using a cognitive control plane to provide application consistent datasets during recovery to maintain data integrity. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for application consistent dataset recovery using a cognitive control plane, the computer-implemented method comprising:
   recording, by a computer, using a cognitive engine, sequence and timestamp of snapshots of volumes in a consistency group across heterogenous storage components corresponding to an application to facilitate operational recovery of application consistent datasets for the application;
   identifying, by the computer, using the cognitive engine, a set of snapshots needed for the operational recovery of the application consistent datasets for the application by mapping the sequence and timestamp of the snapshots of the volumes in the consistency group across the heterogenous storage components corresponding to the application in response to the computer determining that the operational recovery of the application consistent datasets for the application has been requested; and
   performing, by the computer, using the cognitive engine, the operational recovery of the application consistent datasets for the application using the set of snapshots, wherein the computer utilizes the cognitive engine to generate a single display screen view across a heterogenous storage ecosystem that shows both on-premises and hybrid cloud storage components, all applications running in an enterprise and their application to storage components mappings, consistency groups and all metadata corresponding to the consistency groups, and snapshots, and wherein the single display screen view also shows a source primary production site and a target secondary replication site.

2. The computer-implemented method of claim 1 further comprising:
   determining, by the computer, using the cognitive engine, whether a change to a storage ecosystem was detected related to one or more of the volumes of the consistency group of the application;
   responsive to the computer determining that a change to the storage ecosystem was detected related to one or more of the volumes of the consistency group of the application, updating, by the computer, using the cognitive engine, an application to storage components mapping for the consistency group of the application to form an updated application to storage components mapping based on the change to the storage ecosystem related to the one or more of the volumes of the consistency group; and
   updating, by the computer, using the cognitive engine, metadata corresponding to the consistency group of the application with storage component identifiers based on the updated application to storage components mapping.

3. The computer-implemented method of claim 2 further comprising:
   determining, by the computer, using the cognitive engine, whether a snapshot function has been triggered based on a defined time interval;
   responsive to the computer determining that the snapshot function has been triggered based on expiration of the defined time interval, performing, by the computer, using the cognitive engine, a snapshot of each volume in the consistency group of the application in a coordinated manner at that point-in-time; and
   updating, by the computer, using the cognitive engine, the metadata corresponding to the consistency group of the application with snapshot identifiers corresponding to snapshots of the volumes in the consistency group.

4. The computer-implemented method of claim 3 further comprising:
   applying, by the computer, using a rules engine of the cognitive engine, a set of rules on the metadata corresponding to the consistency group of the application and the updated application to storage components mapping;
   generating, by the computer, using an analytics engine of the cognitive engine, a set of actionable insights based on the rules engine applying the set of rules on the metadata corresponding to the consistency group of the application and the updated application to storage components mapping; and
   sending, by the computer, the set of actionable insights to an alerting and automation system to perform a set of action steps.

5. The computer-implemented method of claim 1 further comprising:
   retrieving, by the computer, using the cognitive engine, data regarding the application from a data lake of an enterprise;
   parsing, by the computer, using the cognitive engine, the data regarding the application to identify an application to host relationship and a host to storage relationship corresponding to the application;
   generating, by the computer, using the cognitive engine, the application to storage components mapping for the consistency group of the application based on the application to host relationship and the host to storage relationship corresponding to the application; and
   monitoring, by the computer, using the cognitive engine, for any changes to a storage ecosystem related to the volumes of the consistency group of the application by analyzing metadata fed to the cognitive engine from the data lake.

6. The computer-implemented method of claim 1 further comprising:
   performing, by the computer, a virus scan on the snapshots of the volumes in the consistency group to evaluate data integrity to detect unauthorized access to the volumes.

7. The computer-implemented method of claim 1, wherein the cognitive engine is provided as a cloud service.

8. A computer system for application consistent dataset recovery using a cognitive control plane, the computer system comprising:
   a bus system;
   a storage device connected to the bus system, wherein the storage device stores program instructions; and
   a processor connected to the bus system, wherein the processor executes the program instructions to:
      record, using a cognitive engine, sequence and timestamp of snapshots of volumes in a consistency group across heterogenous storage components corresponding to an application to facilitate operational recovery of application consistent datasets for the application;
      identify, using the cognitive engine, a set of snapshots needed for the operational recovery of the application consistent datasets for the application by mapping the sequence and timestamp of the snapshots of the volumes in the consistency group across the heterogenous storage components corresponding to the application in response to the computer determining that the operational recovery of the application consistent datasets for the application has been requested; and perform, using the cognitive engine, the operational recovery of the application consistent datasets for the application using the set of snapshots, wherein the computer utilizes the cognitive engine to generate a single display screen view across a heterogenous storage ecosystem that shows both on-premises and hybrid cloud storage components, all applications running in an enterprise and their application to storage components mappings, consistency groups and all metadata corresponding to the consistency groups, and snapshots, and wherein the single display screen view also shows a source primary production site and a target secondary replication site.

9. The computer system of claim 8, wherein the processor further executes the program instructions to:

determine, using the cognitive engine, whether a change to a storage ecosystem was detected related to one or more of the volumes of the consistency group of the application;

update, using the cognitive engine, an application to storage components mapping for the consistency group of the application to form an updated application to storage components mapping based on the change to the storage ecosystem related to the one or more of the volumes of the consistency group in response to determining that a change to the storage ecosystem was detected related to one or more of the volumes of the consistency group of the application; and update, using the cognitive engine, metadata corresponding to the consistency group of the application with storage component identifiers based on the updated application to storage components mapping.

10. The computer system of claim 9, wherein the processor further executes the program instructions to:

determine, using the cognitive engine, whether a snapshot function has been triggered based on a defined time interval;

perform, using the cognitive engine, a snapshot of each volume in the consistency group of the application in a coordinated manner at that point-in-time in response to determining that the snapshot function has been triggered based on expiration of the defined time interval; and update, using the cognitive engine, the metadata corresponding to the consistency group of the application with snapshot identifiers corresponding to snapshots of the volumes in the consistency group.

11. The computer system of claim 10, wherein the processor further executes the program instructions to:

apply, using a rules engine of the cognitive engine, a set of rules on the metadata corresponding to the consistency group of the application and the updated application to storage components mapping;

generate, using an analytics engine of the cognitive engine, a set of actionable insights based on the rules engine applying the set of rules on the metadata corresponding to the consistency group of the application and the updated application to storage components mapping; and send the set of actionable insights to an alerting and automation system to perform a set of action steps.

12. The computer system of claim 8, wherein the processor further executes the program instructions to:

retrieve, using the cognitive engine, data regarding the application from a data lake of an enterprise;

parse, using the cognitive engine, the data regarding the application to identify an application to host relationship and a host to storage relationship corresponding to the application;

generate, using the cognitive engine, the application to storage components mapping for the consistency group of the application based on the application to host relationship and the host to storage relationship corresponding to the application; and monitor, using the cognitive engine, for any changes to a storage ecosystem related to the volumes of the consistency group of the application by analyzing metadata fed to the cognitive engine from the data lake.

13. The computer system of claim 8, wherein the processor further executes the program instructions to:

perform a virus scan on the snapshots of the volumes in the consistency group to evaluate data integrity to detect unauthorized access to the volumes.

14. A computer program product for application consistent dataset recovery using a cognitive control plane, the computer program product comprising a computer readable storage medium having program instructions embodied therewith, the program instructions executable by a computer to cause the computer to perform a method of:

recording, by the computer, using a cognitive engine, sequence and timestamp of snapshots of volumes in a consistency group across heterogenous storage components corresponding to an application to facilitate operational recovery of application consistent datasets for the application;

identifying, by the computer, using the cognitive engine, a set of snapshots needed for the operational recovery of the application consistent datasets for the application by mapping the sequence and timestamp of the snapshots of the volumes in the consistency group across the heterogenous storage components corresponding to the application in response to the computer determining that the operational recovery of the application consistent datasets for the application has been requested; and performing, by the computer, using the cognitive engine, the operational recovery of the application consistent datasets for the application using the set of snapshots, wherein the computer utilizes the cognitive engine to generate a single display screen view across a heterogenous storage ecosystem that shows both on-premises and hybrid cloud storage components, all applications running in an enterprise and their application to storage components mappings, consistency groups and all metadata corresponding to the consistency groups, and snapshots, and wherein the single display screen view also shows a source primary production site and a target secondary replication site.

15. The computer program product of claim 14 further comprising:

determining, by the computer, using the cognitive engine, whether a change to a storage ecosystem was detected related to one or more of the volumes of the consistency group of the application;

responsive to the computer determining that a change to the storage ecosystem was detected related to one or more of the volumes of the consistency group of the application, updating, by the computer, using the cognitive engine, an application to storage components mapping for the consistency group of the application to form an updated application to storage components mapping based on the change to the storage ecosystem related to the one or more of the volumes of the consistency group; and updating, by the computer, using the cognitive engine, metadata corresponding to the consistency group of the application with storage component identifiers based on the updated application to storage components mapping.

16. The computer program product of claim 15 further comprising:

determining, by the computer, using the cognitive engine, whether a snapshot function has been triggered based on a defined time interval;

responsive to the computer determining that the snapshot function has been triggered based on expiration of the defined time interval, performing, by the computer, using the cognitive engine, a snapshot of each volume in the consistency group of the application in a coordinated manner at that point-in-time; and updating, by the computer, using the cognitive engine, the metadata corresponding to the consistency group of the application with snapshot identifiers corresponding to snapshots of the volumes in the consistency group.

17. The computer program product of claim 16 further comprising:

applying, by the computer, using a rules engine of the cognitive engine, a set of rules on the metadata corresponding to the consistency group of the application and the updated application to storage components mapping;

generating, by the computer, using an analytics engine of the cognitive engine, a set of actionable insights based on the rules engine applying the set of rules on the metadata corresponding to the consistency group of the application and the updated application to storage components mapping; and sending, by the computer, the set of actionable insights to an alerting and automation system to perform a set of action steps.

18. The computer program product of claim 14 further comprising:

retrieving, by the computer, using the cognitive engine, data regarding the application from a data lake of an enterprise;

parsing, by the computer, using the cognitive engine, the data regarding the application to identify an application to host relationship and a host to storage relationship corresponding to the application;

generating, by the computer, using the cognitive engine, the application to storage components mapping for the consistency group of the application based on the application to host relationship and the host to storage relationship corresponding to the application; and monitoring, by the computer, using the cognitive engine, for any changes to a storage ecosystem related to the volumes of the consistency group of the application by analyzing metadata fed to the cognitive engine from the data lake.

19. The computer program product of claim 14 further comprising:

performing, by the computer, a virus scan on the snapshots of the volumes in the consistency group to evaluate data integrity to detect unauthorized access to the volumes.

* * * * *